Dec. 31, 1929.   G. POHLMANN   1,741,654
TRAILER COUPLING FOR TRACTOR VEHICLES
Filed April 18, 1928   2 Sheets-Sheet 1

G. Pohlmann
INVENTOR

By Marks & Clerk
Attys.

Dec. 31, 1929.    G. POHLMANN    1,741,654
TRAILER COUPLING FOR TRACTOR VEHICLES
Filed April 18, 1928    2 Sheets-Sheet 2
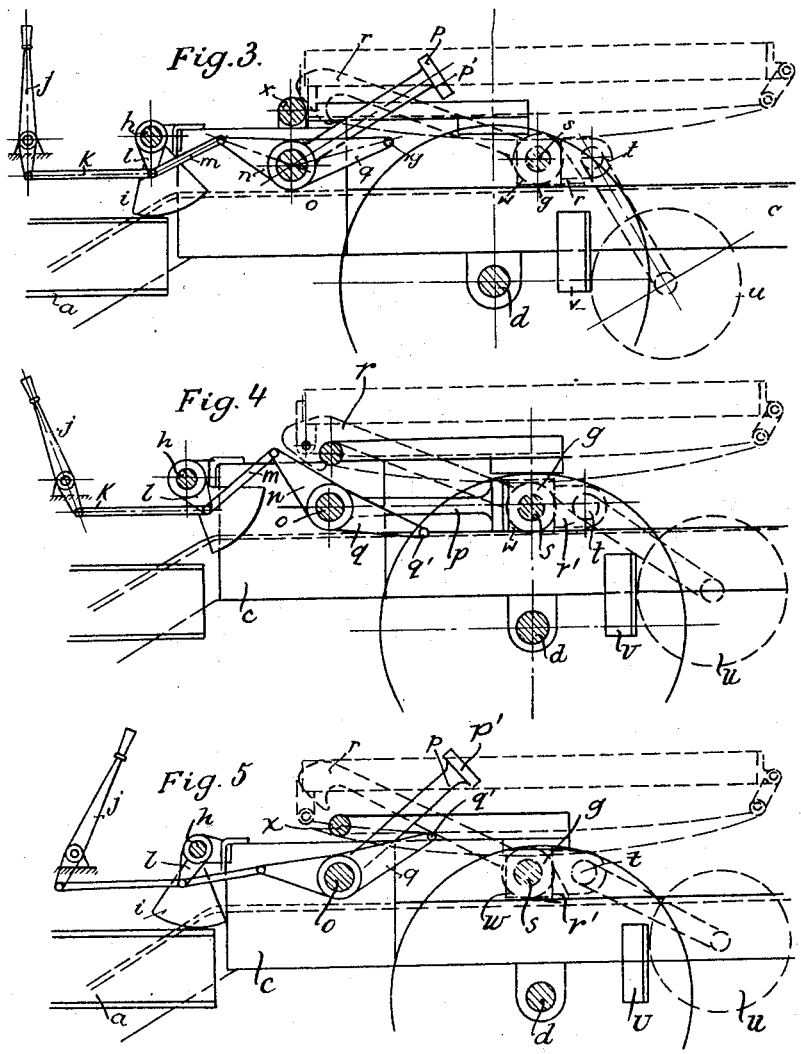
G. Pohlmann
INVENTOR
By Marks & Clerk
Attys.

Patented Dec. 31, 1929

1,741,654

UNITED STATES PATENT OFFICE

GUSTAV POHLMANN, OF COPITZ, NEAR PIRNA, GERMANY, ASSIGNOR, BY MESNE ASSIGNMENTS, TO THILO KIPPING, OF DRESDEN, GERMANY

TRAILER COUPLING FOR TRACTOR VEHICLES

Application filed April 18, 1928, Serial No. 271,007, and in Germany April 25, 1927.

In tractor vehicles with automatic coupling for the trailer, which runs up with rollers on to oblique run-up rails on the tractor, the reliability of the coupling and uncoupling operations and the reliability of the device itself are mainly impaired in operation by the fact that the oblique run-up rails on the tractor, running parallel to one another, and supported with the front and rear ends fixed, are consequently exposed, when the road is uneven, to continual twisting stresses in a transverse direction, and the rear part of the tractor is liable to be lifted off the run-up rails when the trailer begins to run up and when it finishes running down. During the coupling of the vehicles the normal engagement of the coupling members is thereby disturbed, and when the vehicles are travelling the coupling device is also exposed to violent vibration which is liable to cause accidental release thereof.

According to the present invention these defects are obviated and at the same time the coupling is completely protected against release during travel, owing to the fact that the run-up rails resting upon the rear axle of the tractor are only parallel along the part on which running up occurs, and then unite in a point located in their longitudinal central axis, where they are secured to the vehicle frame in such a way that they can be pivoted in all directions, the said vehicle frame being resiliently supported at the back in relation to the run-up rails, and being capable of being clamped to the run-up rails by means of curved supporting members adjustable from the driver's seat, when ascending and uncoupling, while during coupling, with release of the resilient support by the curved supporting members, locking elements connected with the latter pass in front of the run-up rollers on the trailer, to eliminate any play in the coupling direction, and during uncoupling are released again before the removal of the coupling hooks on the trailer.

Figure 1:
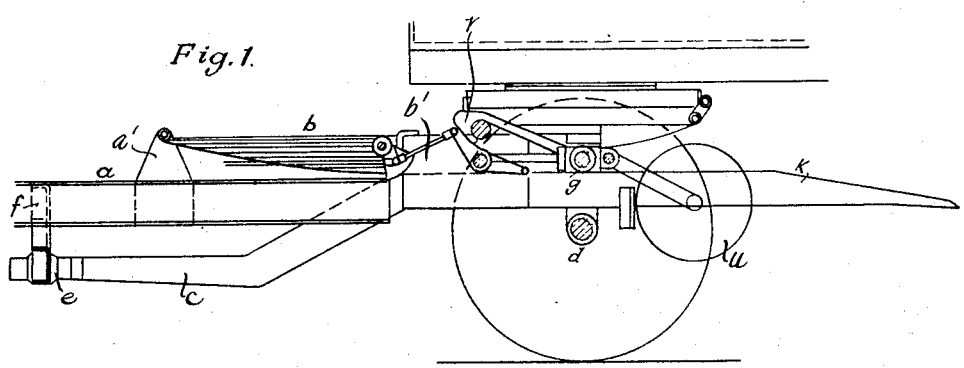
Figure 2:
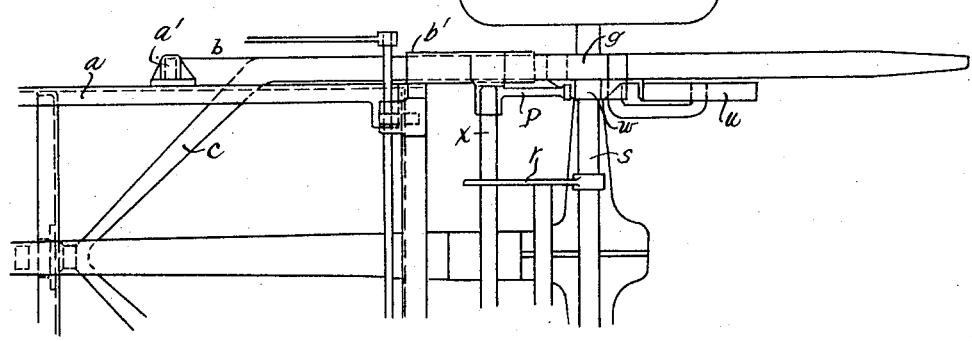

One constructional form of the invention is illustrated in the accompanying drawings, wherein Fig. 1 shows the rear part of the tractor vehicle with the front part of the trailer in side elevation, partly in section, in a coupled condition, Fig. 2 shows a partial plan of Fig. 1, while Figs. 3 to 5 show diagrammatically in side elevation on a larger scale the various positions in relation to one another of the co-operating parts, during running-up, coupling and uncoupling.

In Figs. 1 and 2 $a$ represents one of the longitudinal bearers of the tractor. These longitudinal bearers are suspended by means of spring brackets $a^1$ from springs $b$. The spring buckles $b^1$ of these springs are secured to two run-up rails $c$, (of which in Fig. 2 only one is fully shown), which rest with the bevelled ends facing the trailer directly upon the rear axle $d$ of the tractor. According to the invention the run-up rails $c$ are only parallel to one another at least along the run-up length, and then converge, as shown in Fig. 2, to a point at which they are pivotally secured by means of a ball joint $e$, a Cardan or universal joint, or the like, to a transverse beam $f$ of the vehicle frame $a$. In consequence of this three-point supporting with the pivotal point at $e$, the run-up rails can yield together in a transverse direction to any unevenness of the road, without any twisting of the rails relatively to one another being able to occur. The run-up rollers $g$ on the trailer can consequently run uniformly and without hindrance upon both the run-up rails, and no one-sided springing of the run-up rollers off the run-up rails can take place during travelling, so that wear at the supporting points is diminished.

In order to guard against the rear part of the tractor coming off when the trailer begins to run up on to the run-up rails, curved supporting members $i$ are arranged on the run-up rails upon a transverse shaft $h$ supported on the latter, and these curved supporting members $i$ are adjustable by a hand lever $j$ from the driver's seat through the medium of a connecting rod $k$ and a crank $l$. These curved supporting members $i$, during the running up of the trailer and during uncoupling, are rotated into their operative positions, in which they pass over the rear end of the vehicle frame $a$, which is resiliently supported in relation to the run-up rails c, and thereby eliminate the resilience of the connection between the run-up rails and the vehicle frame and unite these two members into a rigid carrier, so that the entire weight of the tractor opposes the removal of the rear end. By a connecting rod m the crank l is coupled to a second crank n, which is mounted upon a transverse shaft o, likewise supported upon the run-up rails. The transverse shaft o carries locking members p, which are lowered by a corresponding movement of the hand lever j into their locking position, and can be raised again for releasing purposes. Arms q on the shaft o can engage with lateral projections q', under the coupling hooks r on the trailer which are rotatable in a known manner, for example upon the run-up roller spindle s, and by stops r', which, with uncoupled hooks, bear upon a transverse shaft t, which may for example be the rocking shaft of the front wheels u of the trailer, which, in a known manner, by striking against contact surfaces v on the run-up rails c, are rocked out during coupling and removed from the road.

In the drawing, beside the run-up rollers g, are arranged prisms w freely rotatable upon the roller spindle, which, when the vehicles are completely coupled, mount upon lateral widenings of the run-up rails, while the rollers themselves enter recesses in the run-up rails, so as to be completely relieved of load. Correspondingly to the prisms w, the locking members p are provided with plane supporting surfaces p', for the purpose of obtaining satisfactory bearing on the prism surfaces in the locking position.

When the trailer runs up or down, the positioning lever j is first brought by the tractor into the position shown in Fig. 3, in which the curved supports i extend beyond the rear part of the vehicle frame a, and thereby eliminate the resilience between it and the run-up rails c. At the same time the locking members p are located in the raised or released position, and the draw hooks r can slide with their oblique heads over the transverse shaft x in order to engage over it. As soon as this has taken place the lever j is brought into the position shown in Fig. 4, whereby the supporting segments i are rotated away from the rear part of the vehicle frame a, and the resilience thereof released again, while at the same time the locking members p are lowered in front of the prisms w and thereby guard against the coupling hooks coming unhooked in consequence of shocks and vibrations occurring in any direction. The locking members eliminate all play in the coupling.

For the uncoupling the positioning lever j is brought into the position shown in Fig. 5, in which the supporting segments i are again located above the rear end of the vehicle frame a, while after the release of the locking members p and the arms q engage under the draw hooks r and release them, so that the coupling is released and the running down of the trailer is no longer hindered, during which the front wheels u of the trailer rock back in a known manner into their supporting position, in which they are secured, also in a known manner.

What I claim is:—

1. Means for coupling a trailer vehicle to a tractor vehicle, comprising oblique run-up rails supported upon the rear axle of the tractor, springs interposed between the rear part of the tractor and said run-up rails, rollers mounted on the trailer and adapted to run up and down the rails, said rails being parallel to one another throughout the parts along which said rollers have to run and then converging forwards to meet at a point in the longitudinal central plane of the tractor, a universal joint connecting the rails at the said point to the tractor, movable strut levers mounted on the rails and adapted to be interposed between the rails and the rear of the tractor to counteract the resilience of the springs, means for moving said strut levers into and out of their operative position at will from the driver's seat, and locking members mounted on the rails and adapted to take up a locking position in front of the rollers.

2. Means for coupling a trailer vehicle to a tractor vehicle, comprising oblique run-up rails supported upon the rear axle of the tractor, springs interposed between the rear part of the tractor and said run-up rails, rollers mounted on the trailer and adapted to run up and down the rails, said rails being parallel to one another throughout the parts along which said rollers have to run and then converging forwards to meet at a point in the longitudinal central plane of the tractor, a universal joint connecting the rails at the said point to the tractor, movable strut levers mounted on the rails and adapted to be interposed between the rails and the rear of the tractor to counteract the resilience of the springs, during the coupling and uncoupling operations, means for moving said strut levers into and out of their operative position at will from the driver's seat, and locking members operatively connected with said strut levers and adapted to take up a locking position in front of the rollers when the strut levers are in their inoperative position and to release the rollers when the strut levers are in their operative position.

3. Means for coupling a trailer vehicle to a tractor vehicle, comprising coupling hooks pivotally mounted on the trailer and adapted to engage with the tractor, oblique run-up rails supported upon the rear axle of the tractor, springs interposed between the rear part of the tractor and said run-up rails, rollers mounted on the trailer and adapted to run up and down the rails, said rails being parallel to one another throughout the parts along which said rollers have to run and then converging forwards to meet at a point in the longitudinal central plane of the tractor, a universal joint connecting the rails at the said point to the tractor, movable strut levers mounted on the rails and adapted to be interposed between the rails and the rear of the tractor to counteract the resilience of the springs, during the coupling and uncoupling operations, arms operatively connected with said strut levers and adapted to disengage the coupling hooks from the tractor, locking members operatively connected with the strut levers and adapted to take up a locking position in front of the rollers when the strut levers are in their inoperative position and thereby to prevent disengagement of the coupling hooks from the tractor, and to release the rollers when the strut levers are in their oerative position, and actuating means operative at will from the driver's seat for moving the strut levers into and out of their operative position and also for actuating the locking members and the disengaging arms, said actuating means being adapted to move the locking members away from the rollers before causing the arms to disengage the coupling hooks.

4. Means for coupling a trailer vehicle to a tractor vehicle, comprising oblique run-up rails suported upon the rear axle of the tractor, springs interposed between the rear part of the tractor and said run-up rails, rollers mounted on the trailer and adapted to run up and down the rails, prismatic blocks mounted beside said rollers and adapted to relieve said rollers of load when the vehicles are fully coupled, said rails being parallel to one another throughout the parts along which said rollers have to run and then converging forwards to meet at a point in the longitudinal central plane of the tractor, a universal joint connecting the rails at the said point to the tractor, movable strut levers mounted on the rails and adapted to be interposed between the rails and the rear of the tractor to counteract the resilience of the springs, means for moving said strut levers into and out of their operative position at will from the driver's seat, and locking members mounted on the rails and adapted to take up a locking position in front of the rollers, said locking members being formed with flat ends adapted to bear against the prismatic blocks.

In testimony whereof I have signed my name to this specification.

GUSTAV POHLMANN.